United States Patent [19]

Horii et al.

[11] Patent Number: 5,411,448

[45] Date of Patent: May 2, 1995

[54] GEAR SHIFTING MECHANISM FOR A TRANSMISSION

[75] Inventors: Yoshiyuki Horii; Masashi Amano, both of Saitama, Japan

[73] Assignee: Honda Giken Kogyo Kabushiki Kaisha, Tokyo, Japan

[21] Appl. No.: 132,324

[22] Filed: Oct. 6, 1993

[30] Foreign Application Priority Data

Oct. 6, 1992 [JP] Japan .................. 4-267674
Mar. 24, 1993 [JP] Japan .................. 5-089301

[51] Int. Cl.⁶ ............... F16H 59/04; B60K 20/00; B62K 23/00
[52] U.S. Cl. .................. 477/102; 477/109; 74/337.5; 74/474; 74/481; 74/625; 74/490.11
[58] Field of Search .......... 74/337.5, 474, 479 PM, 74/481, 625; 477/102, 101, 109

[56] References Cited

U.S. PATENT DOCUMENTS

| 3,421,384 | 1/1969 | Okamota et al. | 74/337.5 |
| 3,712,156 | 1/1973 | Kuhnle | 477/109 X |
| 4,510,820 | 4/1985 | Tsuboi | 74/474 |

FOREIGN PATENT DOCUMENTS

| 59-50257 | 3/1984 | Japan | 74/474 |
| 60-34555 | 2/1985 | Japan . | |
| 3-81537 | 4/1991 | Japan . | |

Primary Examiner—Charles A. Marmor
Assistant Examiner—Nathan O. Jensen

[57] ABSTRACT

A gear shifting mechanism for a transmission, capable of driving the gearshift drum of the transmission for turning in both a shift-up direction and a shift-down direction by operating a switch or a valve. A sector gear is formed on a gearshift arm fixed to a gearshift spindle to drive a gearshift drum. A driving gear, engaged with an idle gear engaged with the sector gear, is fixed to the rotary shaft of a pneumatic rotary actuator. The pneumatic rotary actuator is attached to the transmission case of a transmission, and compressed air is supplied into either a first pressure chamber or a second pressure chamber of the rotary actuator through a solenoid selector valve to turn the rotary shaft in either the normal direction or the reverse direction. The present invention provides an auxiliary gear shifting system which enables gear shifting operation without the operator using his/her foot. An actuator operatively connected to a gearshift arm is driven by compressed air reserved in a main frame and supplied thereto through an air valve and a pneumatic switch. Part of the compressed air supplied to the actuator is supplied to a pressure switch to make an ignition unit reduce the output of the engine temporarily during the operation of the actuator. The pneumatic switch can be remote-controlled by an operator's hand through a remote-control wire by operating a switch lever disposed near the grip of a handlebar.

19 Claims, 7 Drawing Sheets

GEAR SHIFTING MECHANISM FOR A TRANSMISSION

DETAILED DESCRIPTION OF THE INVENTION

1. Field of the Invention

The present invention relates primarily to a gear shifting mechanism for a transmission for a motorcycle and, more specifically, to an improvement in a gear shifting mechanism comprising a gearshift spindle supported on the transmission case of the transmission so as to be turned by a gearshift pedal, and a gearshift arm fixed to the gearshift spindle for turning to drive a gearshift drum journaled on the transmission case. The present invention is also directed to an auxiliary gear shifting system for a motorcycle, capable of changing the speed of a constant-mesh transmission by using an auxiliary power source, such as the power of compressed air.

2. Description of Background Art

A gear shifting mechanism for a motorcycle as disclosed in, for example, Japanese Patent Laid-open (Kokai) No. 60-34555, transmits a portion of the power of the engine of the motorcycle through a clutch interlocked with a gearshift pedal to the gearshift drum of the transmission to drive the gearshift drum in a shift-up direction when the gearshift pedal is operated, to reduce the gearshift pedal operating force.

An auxiliary gear shifting system for a motorcycle is disclosed in Japanese Patent Laid-open (Kokai) No. 3-81537. This auxiliary gear shifting system reduces the output of the engine temporarily by varying an ignition lag angle according to throttle valve opening and the variation of throttle valve opening. A gearshift pedal is operated by an operator's foot for a gear shifting operation.

The power transmission system for transmitting a portion of the power of the engine to the gearshift drum and the clutch for engaging and disengaging a transmission system of a gear shifting mechanism is a complex arrangement of elements. Moreover, since the gearshift drum is driven only in a shift-up direction, the gearshift pedal operating force cannot be reduced during a shifting down of the transmission.

SUMMARY AND OBJECTS OF THE INVENTION

The present invention provides a gear shifting mechanism for a transmission, having a simple construction which is capable of driving the gearshift drum of the transmission in both a direction for shift-up and a direction for shift-down.

It sometimes occurs that the optimum timing of the gearshift operation cannot be achieved if the foot is off the gearshift pedal of an off-road motorcycle by chance while the off-road motorcycle is running on a rough road or terrain. Therefore, it is desirable that gearshift operation can be carried out by operating an auxiliary gear shifting system by external power applied by means other than the foot, such as the hand. The present invention is intended to fulfill such a desire.

It is an object of the present invention to provide a sector gear formed on a gearshift arm, a gear for driving the sector gear is mounted on the rotary shaft of a reversible rotary actuator attached to the transmission case of a transmission.

It is another object of the present invention to provide an auxiliary gear shifting system for a motorcycle, which turns the gearshift shaft of the constant-mesh transmission of the motorcycle to shift the gears by using an external power, such as the power of compressed air or the like in addition to the turning of the gearshift shaft through a gearshift arm by a gearshift pedal. The external power may be the power of compressed air, and an air tank for reserving compressed air is disposed within a main frame extending longitudinally of the body of the motorcycle over the engine.

An auxiliary gear shifting system further includes an air valve for controlling the supply of compressed air from the air tank to an actuator disposed near the gearshift shaft to turn the gearshift shaft in a direction for gear shifting, disposed on the crankcase of the engine on one side of the air tank, and an air pump for supplying compressed air into the air tank, disposed on the crankcase of the engine on the other side of the air tank. The air valve may be a remote controlled valve actuated by means disposed on the handlebar of the motorcycle.

An auxiliary gear shifting system is also provided wherein a portion of the compressed air is supplied to a pressure switch to detect the pressure of the compressed air when the actuator operates and to send a signal to an ignition unit for controlling the ignition timing of the engine. The ignition unit reduces the output of the engine temporarily while the actuator operates according to the detection signal of the pressure switch.

It is an object of the present invention to use the main frame, i.e., a comparatively large member longitudinally extending substantially in the central portion of the body, as an air reservoir, the air reservoir including a sufficiently large capacity and the air reservoir can be easily connected to the engine by tubes.

A well-balanced lateral arrangement of the support members of the motorcycle are provided without substantially increasing the width of the motorcycle because the air pump and the air valve are disposed on the crankcase on the opposite sides of the air reservoir, respectively.

Hand-operation of the gear shifting operation is possible instead of foot-operated gear shifting operation because the air valve can be remotely controlled by an actuator disposed on the handlebar of the motorcycle.

A smooth gear shifting operation is possible because the ignition unit is controlled in connection with the gear shifting operation by a portion of the compressed air supplied to the actuator for gear shifting operation to reduce the output of the engine temporarily during the operation of the actuator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A gear shifting mechanism in a preferred embodiment according to the present invention will be described hereinafter with reference to the accompanying drawings.

Figure 1:
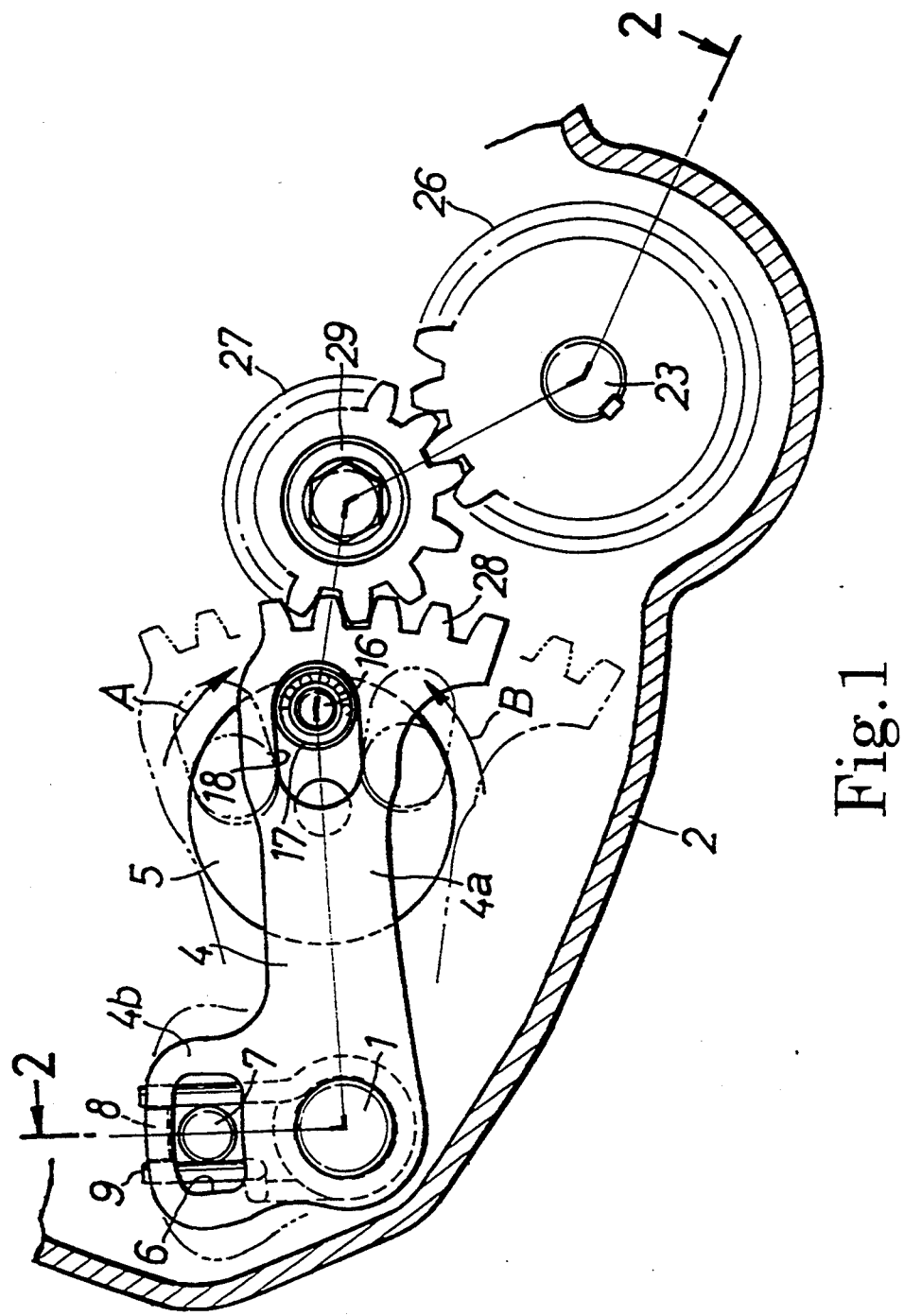
FIG. 1 is a side view of a gear shifting mechanism in a preferred embodiment according to the present invention taken along line 1—1 in FIG. 2.
Figure 2:
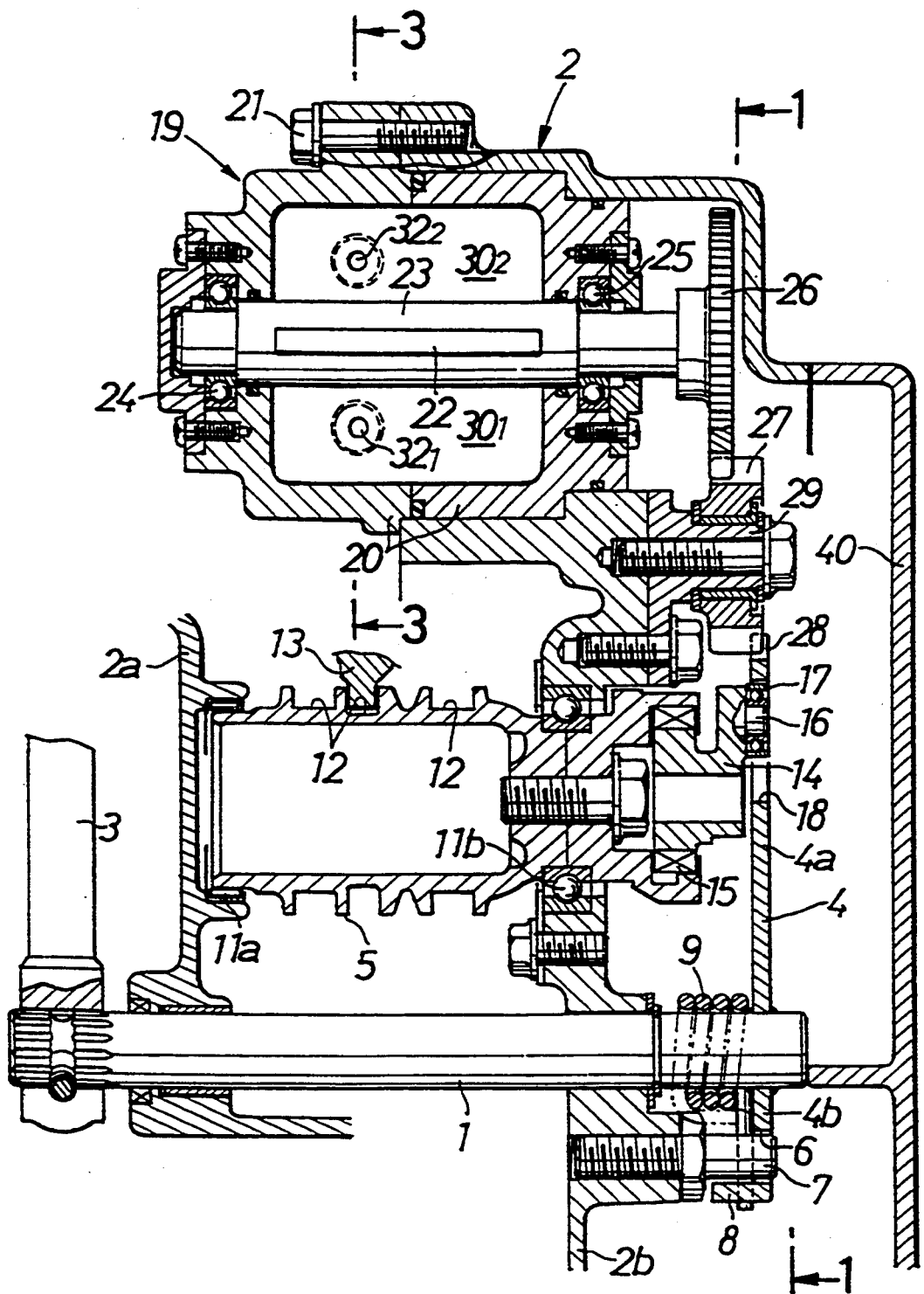
FIG. 2 is a sectional view taken along line 2—2 in FIG. 1.

Referring to FIGS. 1 and 2, a gearshift spindle 1 extends across the transmission case 2 of a power unit mounted on a motorcycle, and is journaled at its opposite ends, respectively, to penetrate the opposite side walls 2a and 2b of the transmission case 2. A gearshift pedal 3 is positioned on the serrated left end of the gearshift spindle 1, and a gearshift arm 4 is welded to the right end of the gearshift spindle 1.

As illustrated in FIG. 1, the gearshift arm 4 includes a longer arm 4a extending toward a gearshift drum 5 and a shorter arm 4b extending perpendicularly to the longer arm 4a. The shorter arm 4b is provided with a slot 6 having the shape of a circular arc of a circle having its center on the center axis of the gearshift spindle 1. A stopper pin 7 fixed to the transmission case 2 is fitted in the slot 6 to define an angular range of turning of the gearshift arm 4. A portion of the free end of the shorter arm 4b is bent to form a projection 8. When the midpoint of the slot 6 coincides with the stopper pin 7, the projection 8 is aligned radially with the stopper pin 7. The coil portion of a torsion coil spring 9 is positioned on the gearshift spindle 1 so that both the stopper pin 7 and the projection 8 are positioned between the opposite arms thereof. Normally, the gearshift arm 4 is held at its neutral position with the projection 8 thereof held in alignment with the stopper pin 7 by the torsion coil spring 9. When the gearshift pedal 3 is turned upward or downward from its neutral position, the angle of upward or downward turning of the gearshift arm 4 is limited by the engagement of one or the other end of the slot 6 with the stopper pin 7.

The opposite ends of the gearshift drum 5, which is extended with its axis in parallel to the axis of the gearshift spindle 1 are supported rotatably in bearings 11a and 11b on the opposite side walls 2a and 2b of the transmission case 2, respectively. A shift fork 13 engaged within a cam groove 12 formed in the outer circumference of the gearshift drum 5 is moved to shift the speed change gears, not shown, of the transmission to shift down the transmission when the gearshift drum 5 is turned in the direction of the arrow A as illustrated in FIG. 1. The shift fork 13 is moved to shift the speed change gears of the transmission to shift up the transmission when the gearshift drum 5 is turned in the direction of the arrow B as illustrated in FIG. 1.

A driving ring 14 positioned on the right end of the gearshift drum 5 is operatively connected to the gearshift drum 5 by a reversible ratchet mechanism 15. The driving ring 14 is provided with an eccentric shaft 16, and a roller 17 positioned on the eccentric shaft 16 is fitted in a slot 18 formed in the longer arm 4a. The foregoing construction is the same as that of a well-known gear shifting mechanism.

The cylinder 20 of a pneumatic rotary actuator 19 is fastened to the right side wall 2b of the transmission case 2 with bolts 21 with its axis in parallel to the axis of the gearshift drum 5. A rotary piston 22 extends into the cylinder 20, and a rotary shaft 23 connected to the rotary piston 22 is supported in bearings 24 and 25 on the opposite end walls of the cylinder 20. A driving gear 26 is fixed to the right end of the rotary shaft 23, and an idle gear 27 engaged with the driving gear 26 is engaged with a sector gear 28 formed at the free end of the longer arm 4a of the gearshift arm 4. The idle gear 27 is supported for rotation on a shaft fixed 29 to the transmission case 2.

Figure 3:
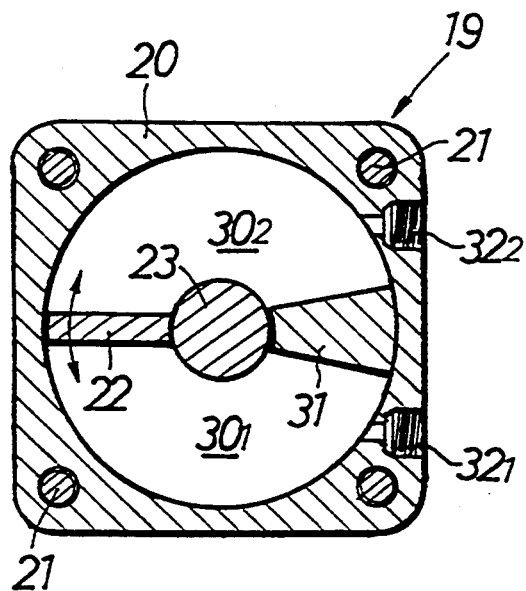
FIG. 3 is a sectional view taken along line 3—3 in FIG. 2.

Referring to FIG. 3, a partition wall 31 is fixed to the inner circumference of the cylinder 20 to partition the interior of the cylinder 20 into a first chamber $30_1$ and a second chamber $30_2$ in combination with the rotary piston 22. Inlet ports $32_1$ and $32_2$ are formed in the cylinder 20 so as to open respectively into the first chamber $30_1$ and the second chamber $30_2$.

Figure 4:
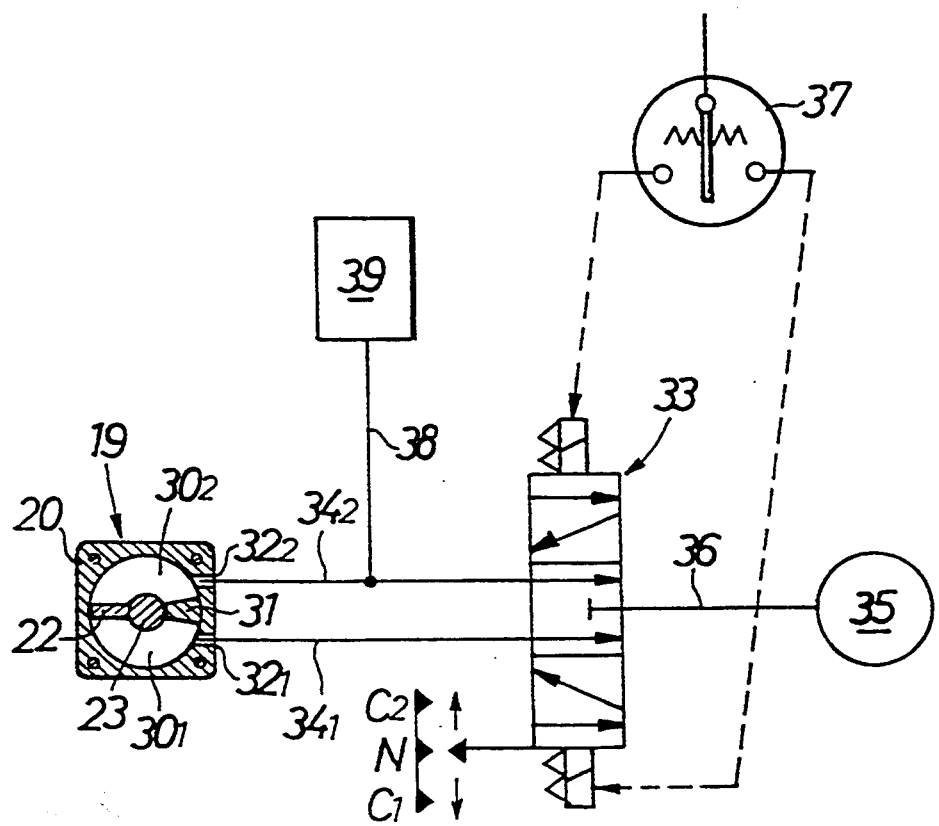
FIG. 4 is a pneumatic circuit diagram of a pneumatic circuit for operating a rotary actuator.

Referring to FIG. 4, a first air passage $34_1$ and a second air passage $34_2$ extend from one side of a solenoid selector valve 33 and are connected to the ports $32_1$ and $32_2$, respectively. A high-pressure air passage 36 extending from a compressed air reservoir 35 is connected to the other end of the solenoid selector valve 33. The position of the solenoid selector valve 33 is changed from a neutral position N to a first position $C_1$ or a second position $C_2$ by operating a change switch 37 disposed at an appropriate position on the handlebar of the motorcycle. When the solenoid selector valve 33 is set in the neutral position, the air passages $34_1$ and $34_2$ are opened to the atmosphere. When the solenoid selector valve 33 is set in the first position $C_1$ the high-pressure air passage 36 is connected to the first air passage $34_1$ and the second air passage is opened to the atmosphere. When the solenoid selector valve 33 is set in the second position $C_2$ the high-pressure air passage 35 is connected to the second air passage $34_2$ and the first air passage $34_1$ is opened to the atmosphere.

A pneumatic engine output reducing device 39 is connected by a branch passage 38 to the second air passage $34_2$. The engine output reducing device 39 is, for example, an ignition timing controller which retards ignition angle of the engine when compressed air is supplied thereto.

A side cover 40 is illustrated in FIG. 2 which is fastened to the transmission case to cover the gear shifting mechanism.

The operation of the gear shifting mechanism according to the present invention will be described hereinafter. If the change switch 37 is operated to set the solenoid selector valve 33 in the first position $C_{18}$, then the high-pressure passage 36 is connected to the first air passage $34_1$, the second air passage $34_2$ is opened to the atmosphere and, consequently, compressed air is supplied from the compressed air reservoir 35 into the first chamber $30_1$ of the rotary actuator 19 to turn the rotary piston 22 and the rotary shaft 23 clockwise, as viewed in FIG. 4, together with the driving gear 26. Consequently, the driving gear 26 turns the sector gear 28 downwardly through the idle gear 27 to turn the gearshift arm 4 downwardly. Thereafter, the gearshift arm 4 depresses the eccentric shaft 16 received in the slot 18 thereof to turn the driving ring 14 through a predetermined angle. Then, the gearshift drum 5 is turned in the shift-down direction A through the same angle to shift down the transmission by one speed.

Since the first air passage $34_1$ and the second air passage $34_2$ are opened to the atmosphere when the change switch 37 is opened to return the solenoid selector valve 33 to the neutral position N, the atmospheric pressure prevails in both the pressure chambers $30_1$ and $30_2$ to hold the rotary actuator 19 in an inoperative position. Then, the gearshift arm 4 is returned to the neutral position by the resilience of the torsion coil spring 9 and the rotary piston 22 is returned to the neutral position. However, the gearshift drum 5 is restrained from reverse turning by the ratchet mechanism 15.

When the change switch 37 is operated to set the solenoid selector valve 33 in the second position $C_2$, the high-pressure air passage 36 is connected to the second air passage $34_2$ and the first air passage $34_1$ is opened to the atmosphere. Consequently, compressed air is supplied from the compressed air tank 35 into the second pressure chamber $30_2$ to turn the rotary piston 22 counterclockwise as viewed in FIG. 4. Thereafter, the gearshift drum 5 is turned in the shift-up direction through a predetermined angle to shift up the transmission by one speed. When the change switch 37 is opened, the solenoid selector valve 33 is set in the neutral position N, the gearshift arm 4 is returned to the neutral position by the resilience of the torsion coil spring 9 while the gearshift drum 5 is restrained from reverse turning by the ratchet mechanism 15.

Incidentally, when the solenoid selector valve 33 is set in the second position $C_2$ to supply compressed air into the second air passage $34_2$, the high pressure of the compressed air is applied through the branch passage 38 to the engine output reducing device 39 to operate the same so that the output of the operating engine is reduced by a predetermined decrement. Consequently, torque acting on the tooth faces of the speed change gears of the transmission is reduced temporarily and thereby the resistance against the shifting operation of the transmission is reduced accordingly. Therefore, the transmission can be easily shifted up without disengaging the clutch.

When the gearshift pedal 3 is turned upward or downward with the solenoid selector valve 33 set in the neutral position N, the gearshift arm 4 can be turned by the gearshift spindle 1 to turn the gearshift drum 5 in the shift-up direction or the shift-down direction for ordinary gear shifting operation. Since both the first air passage $34_1$ and the second air passage $34_2$ connected respectively to the pressure chambers $30_1$ and $30_2$ of the rotary actuator 19 are opened to the atmosphere in this state, the rotary piston 22 can be smoothly turned by the gearshift arm 4 without obstructing the turning of the gearshift arm 4.

Various modifications of the design of the foregoing embodiment are possible without departing from the scope of the present invention. For example, the change switch 37 may be operated by the gearshift pedal 3, and the rotary actuator 19 may be substituted with a hydraulic rotary actuator.

As is apparent from the foregoing description, since the sector gear is formed on the gearshift arm, the driving gear is mounted on the rotary shaft of the reversible rotary actuator to drive the sector gear and the rotary actuator is attached to the transmission case, the gearshift drum can be driven for turning both in the shift-up direction and the shift-down direction by operating the switch or the valve to turn the rotary shaft of the rotary actuator in the normal and reverse directions for easy, reliable gear shifting operation. Furthermore, since the gear shifting operation does not use the power of the engine, the gear shifting mechanism need not be provided with any clutch for interrupting power transmission, the gear shifting mechanism is simple in construction, has a large degree of freedom of determination of the position of the rotary actuator, and hence is applicable to various transmissions.

Figure 5:
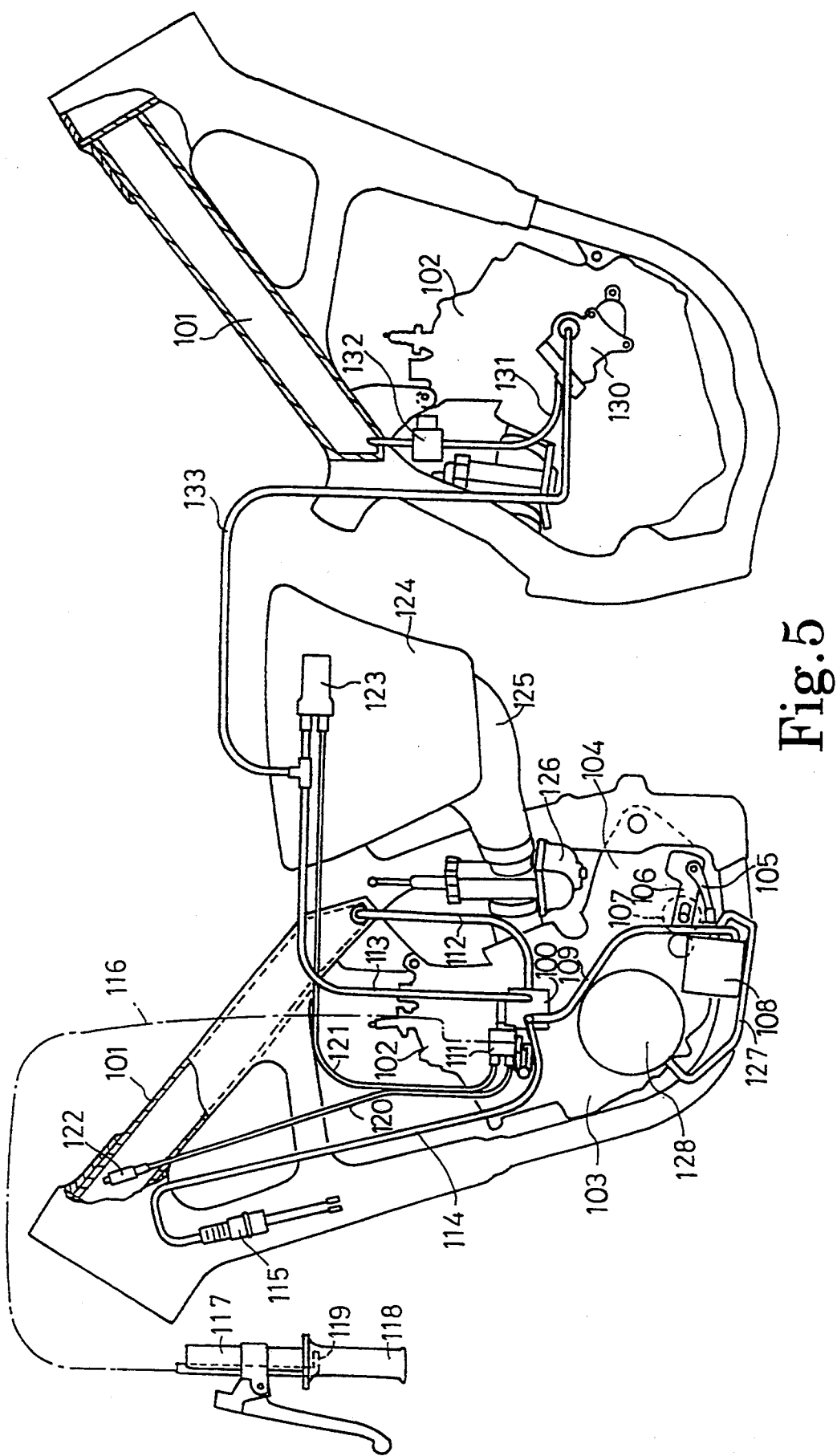
FIG. 5 is a partially cut-away elevational view illustrating both the right and left sides of essential portions of the body of a motorcycle incorporating an auxiliary gear shifting system in a preferred embodiment according to the present invention.

An auxiliary gear shifting system in a preferred embodiment according to the present invention will be described with reference to FIGS. 5 to 8. FIG. 5 is a development view showing both the left and right sides of a motorcycle frame and illustrating essential portions of an engine of a motorcycle.

On the left side of the essential portions shown on the left in FIG. 5, a body extends longitudinally of a main frame 101. The main frame 101 is a hollow structure having an internal space throughout the entire length thereof to serve as an air reservoir.

An engine 102 having a crankcase 103 are disposed under the main frame 101 and are supported on the frame. A well-known constant-mesh transmission is contained in a transmission case 104 disposed behind and joined to the crankcase 103.

A gearshift pedal 105 and a gearshift arm 106 connected to the gearshift pedal 105 are disposed outside the transmission case 104. The gearshift arm 106 is turned to operate a gearshift shaft 107 for a gear shifting operation.

The gearshift arm 106 can also be turned by an actuator 108, which will be described later. The actuator is connected by a supply tube 109 to an air valve 100 disposed above the crankcase 103. The air valve 100 is controlled by a pneumatic switch 111 incorporated into the air valve 100.

A supply tube 112 connected to the main frame 101, a discharge tube 113 and a supply tube 114 are connected to the air valve 100. The supply tube 114 is connected to a pressure switch 115 for controlling an ignition unit, not shown.

Normally, compressed air is not supplied to the pressure switch 115 and the pressure switch 115 is in an off-state. When compressed air is supplied to the pressure switch 115 to set the same in an on-state, the pressure switch 115 sends a sensor signal to the ignition unit to make the ignition unit start the engine output reducing operation. The modes of operation of the ignition unit when the pressure switch 115 is in an on and an off condition may be reversed.

A remote-control wire 116 has one end connected to the pneumatic switch 111 and the other end connected to a switch lever 119 disposed near the grip 118 of a handle bar 117. One end of each of a supply tube 120 and a discharge tube 121 is connected to the pneumatic switch 111. The other end of the supply tube is connected through a check valve 122 to the main frame 101. The interior of the main frame 101 and the pneumatic valve 100 communicate with each other by means of the supply tube 120 only when the remote-control wire 116 is actuated.

When the remote-control wire 116 is actuated, compressed air is supplied through the supply tube 120 to the pneumatic valve 100 and the discharge tube 121 is disconnected from the atmosphere, so that the pressure of compressed air is applied to the pneumatic valve 100 to connect the supply tube 112 to communicate with the supply tubes 109 and 114.

While the supply tube 120 is disconnected from the pneumatic valve 100 by the pneumatic switch 111, the pneumatic valve 100 is opened to the atmosphere through the discharge tubes 113 and 121.

The discharge tube 121 has one end connected to the pneumatic valve 100 and the other end connected to an air filter 123, to which the discharge tube 113 is connected. The air filter 123 is positioned on the dirty side of an air cleaner 124. The clean side of the air cleaner 124 is connected by a connecting tube 125 to a carburetor 126.

A discharge tube 127 has one end connected to a chamber of the actuator 108, in which air is compressed, to relieve the pressure in the chamber and the other end inserted through an ACG cover 128 into an ACG to discharge air into the ACG for cooling.

Figure 7:
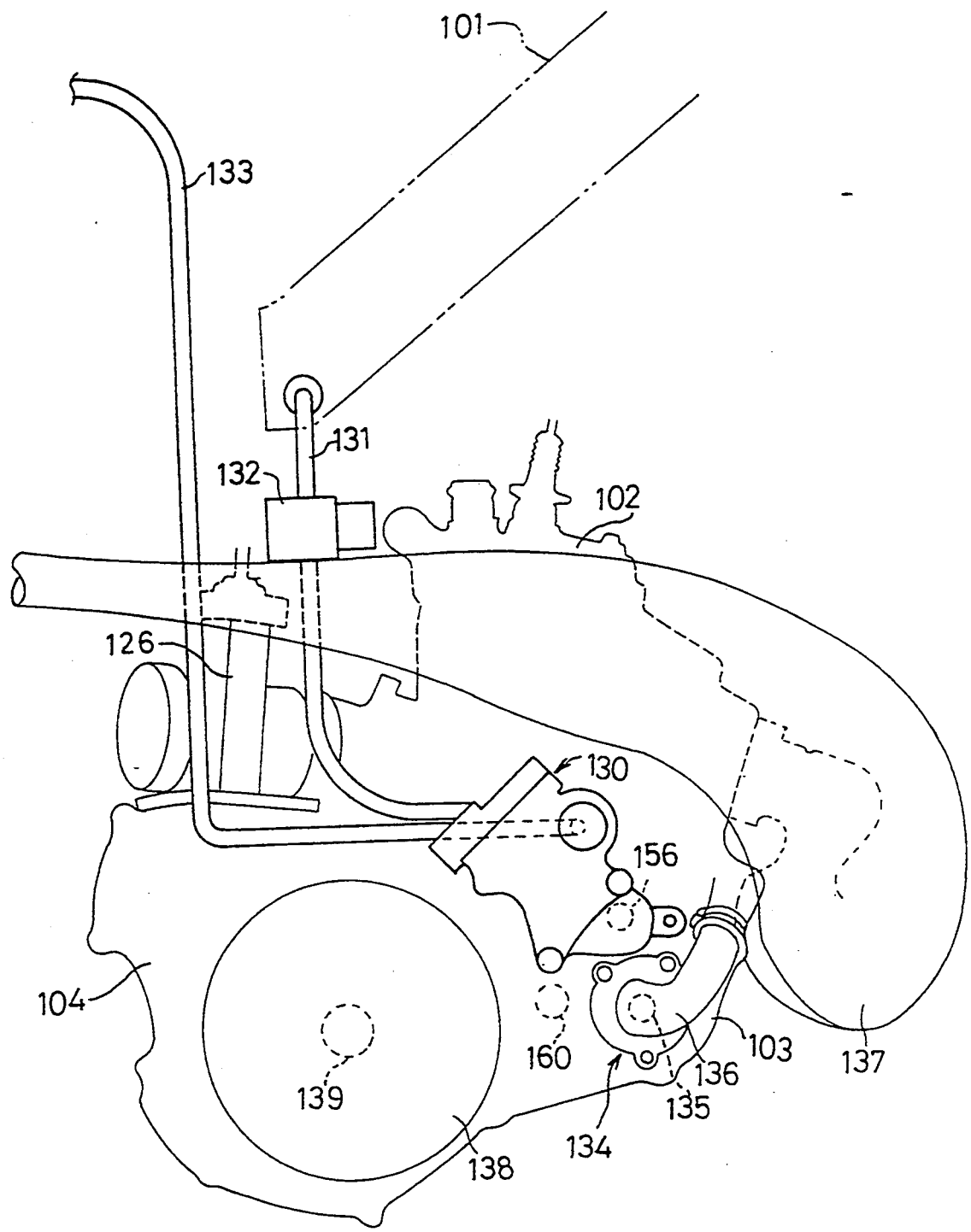
FIG. 7 is a right side elevational view of essential portions of the embodiment illustrated in FIG. 5.

FIG. 7 illustrates an enlarged view of the essential portions of the right-hand portion of the body shown in FIG. 5. An air pump 130 of a plunger type is disposed on the left portion of the crankcase 103 to supply compressed air continuously through a supply tube 131 and a regulator 132 is disposed on the supply tube 131 into the main frame 101.

A suction pipe 133 connects the middle portion of the discharge tube 113 to the air pump 130 to return air discharged from the air valve 100.

A water pump 134 is disposed below the air pump 130. As illustrated in FIG. 7, the water pump 134 includes a shaft 135 and a water hose 136. An exhaust pipe 137 extends longitudinally on the right side of the engine 102 so as to protect the air pump 130. A clutch and a main shaft 139 are disposed in a chamber covered with a clutch cover 138.

Figure 6:
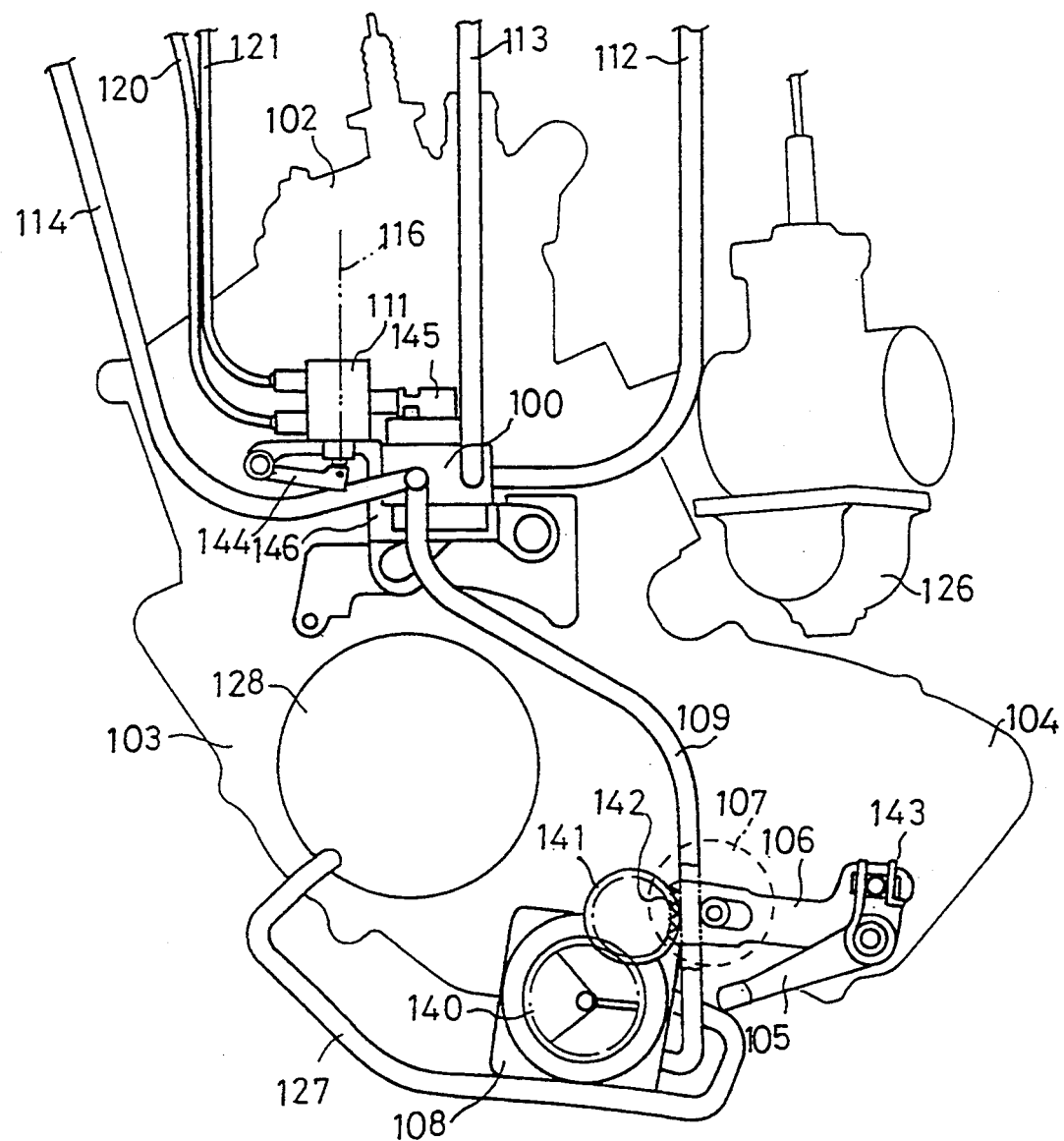
FIG. 6 is a left side elevational view of essential portions of the,embodiment illustrated in FIG. 5.

FIG. 6 illustrates an enlarged view of a portion of the auxiliary gear shifting system on the left side of the body. As is obvious from FIG. 6, the actuator 108 is a rotary pneumatic actuator operated by the pressure of compressed air. The actuator 108 has a gear 140, a driving gear 141 engaged with the gear 140, and a sector gear 142 engaged with the driving gear 141 and formed on one end of the gearshift arm 106.

When the gear 140 is turned, the driving gear 141 turns the gearshift arm 106 to turn the gearshift shaft 107 for a gear shifting operation.

The gearshift arm 106 is biased by a return spring 143 so as to return to its neutral position when the supply of compressed air to the actuator 108 is stopped.

An operating arm 144 for operating the pneumatic switch 111 is supported pivotally for a swinging motion. Normally, the operating arm 144 is biased in a direction to set the pneumatic switch in an off condition in which the pneumatic switch 111 disconnects the supply tube 120 and the air valve 100 from each other. When actuated by the remote-control wire 116, the operating arm 144 sets the pneumatic switch in an on condition to connect the supply tube 120 to the air valve 100.

The pneumatic switch 111 is connected to the air valve 100 by a connector 145. The pneumatic switch 111 and the air valve 100 are attached to a supporting plate 146.

Figure 8:
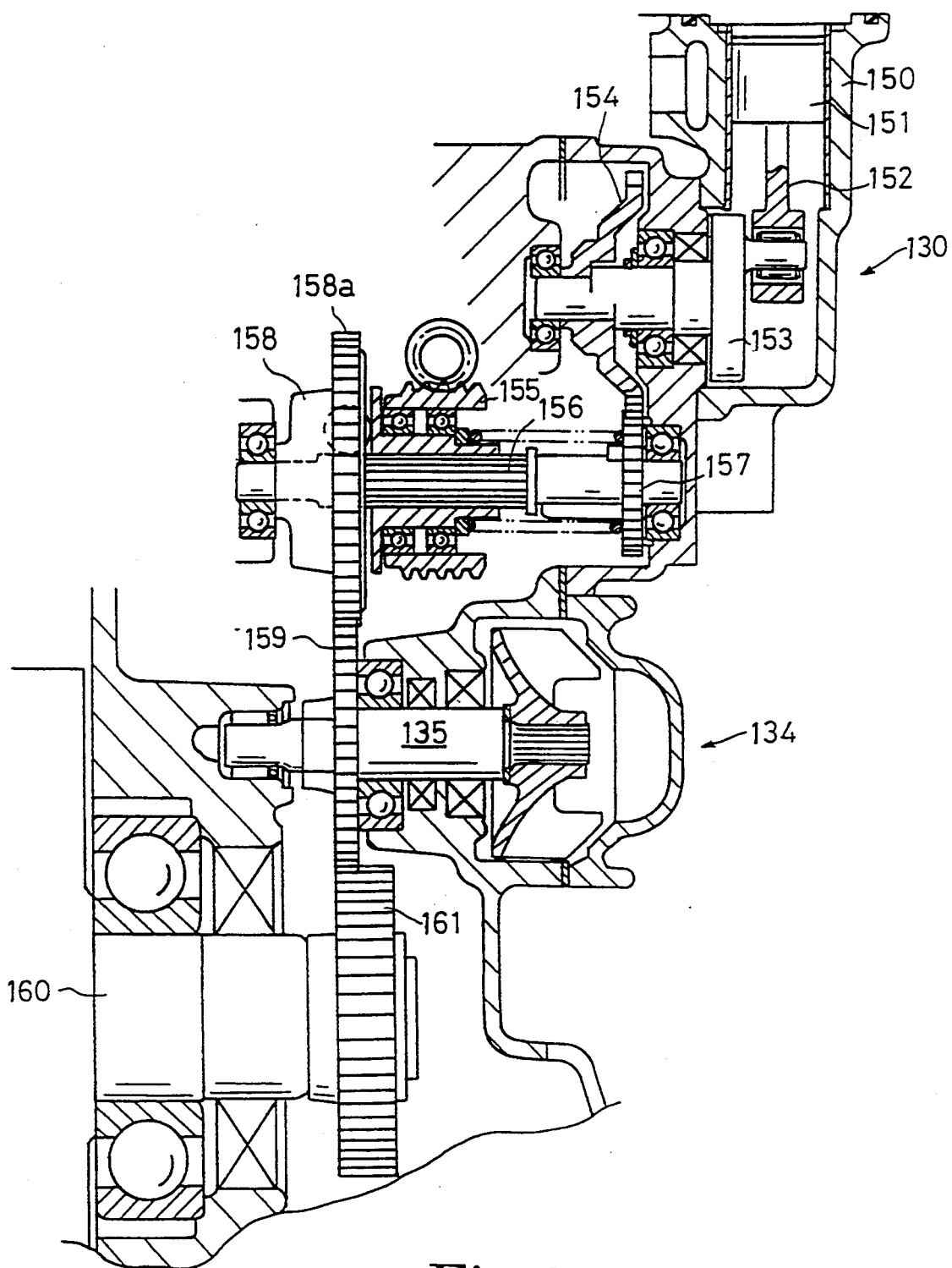
FIG. 8 is a fragmentary sectional view of essential portions of the embodiment illustrated in FIG. 5.

FIG. 8 is a fragmentary, sectional plan view of the engine showing the air pump 130. The air pump 130 has a cylinder 150, a piston 151 axially slidably fitted in the cylinder 150, a crankshaft 153 and a connecting rod 152 connecting the piston 151 to the crankshaft 153.

A driving gear 154 mounted on the crankshaft 153 is engaged with a gear 157 mounted on one end of a governor shaft 156 provided with a driving gear 155 included in an exhaust control device. Thus, power is transmitted through the governor shaft 156 to the driving gear 154.

A weight guide 158 coaxial with the governor shaft 156 has an external gear 158a engaged with a driving gear 159 mounted on the shaft 135 of the water pump 134 and engaged with a gear 161 mounted on the crankshaft 160 of the engine.

As is obvious from FIG. 7, the governor shaft 156 is disposed in front of the crankshaft 160 of the engine and above the water pump 134.

Referring to FIG. 5, the switch lever 119 disposed near the grip 118 is actuated by an operator's fingers to actuate the auxiliary gear shifting system for gear shifting operation. Then, the remote-control wire 116 operates the pneumatic switch 111 so that compressed air is supplied through the supply tube 120 into the air valve 100 and, consequently, the discharge tube 113 is disconnected from the air valve 100 and interconnects the supply tubes 112, 109 and 114.

Then, compressed air supplied through the supply tube 109 drives the actuator 108 to turn the gearshift arm 106. At the same time, compressed air supplied through the supply tube 114 applies pressure to the pressure switch 115 to control the ignition unit to stop ignition while the pressure is applied to the pressure switch 115.

Consequently, the output of the engine is reduced temporarily, so that the gearshift shaft 107 is able to turn smoothly to disengage a dog clutch, not shown, included in the constant-mesh transmission to quickly complete the gear shifting operation.

When the switch lever 119 is released after the completion of the gear shifting operation, the remote-control wire 116 returns to its initial position, the pneumatic switch 111 disconnects the supply tube 120 from the air valve 100 and connects the discharge tube 113 to the air valve 100. The air valve 100 disconnects the supply tube 109 from the supply tube 112 and connects the supply tube 109 to the discharge tubes 113 and 121.

Consequently, compressed air disposed within the actuator 108 is discharged quickly into the atmosphere through the supply tube 109 and the discharge tubes 113 and 121, the pressure within the actuator 108 is relieved to allow the gearshift arm 106 to return to its neutral position, and the actuator 108 is restored to the initial state to complete the gear shifting operation.

The main frame 101 is a comparatively large component of the body and is used effectively as an air reservoir without requiring any additional space for installing an air reservoir. The main frame 101 has a sufficiently large capacity as an air reservoir and facilitates the arrangement of the tubes for connecting the air reservoir to the component parts arranged on the engine 102.

Since the air pump 130 and the air valve 100 are disposed on opposite sides, respectively, of the main frame 101 serving as an air reservoir on the crankcase 103, the component parts can be disposed in a well-balanced arrangement without substantially increasing the width of the motorcycle. The air pump 130 can be driven for efficient operation by the governor shaft 156 of the exhaust control device, and the air pump 130 and the component parts can be protected by the exhaust pipe 137.

Since the pneumatic switch 111 for controlling the air valve 100 is disposed near the air valve 100, the air valve 100 and the pneumatic switch 111 can be disposed in a compact arrangement. The auxiliary gear shifting system can be operated by operating the switch lever 119 by utilizing the hand gripping the grip 118 of the handlebar 117. Thus, the auxiliary gear shifting system can be operated by hand instead of by foot, and the gear shifting operation can be easily achieved at the appropriate gear shifting time even during the condition in which it is difficult for the operator to use his/her foot.

Furthermore, since a portion of the compressed air supplied to the actuator 108 for the gear shifting operation is supplied to the pneumatic switch 115 and the output of the engine 102 is reduced temporarily during the operation of the actuator 108 by the ignition unit on the basis of a detection signal provided by the pneumatic switch 115, the gear shifting operation can be easily and quickly carried out and the compressed air can be effectively used as sensing means for controlling the output of the engine 102.

The present invention utilizes a comparatively large portion of the body effectively as an air reservoir without requiring an additional space for installing the component parts of the auxiliary gear shifting system. The positioning of the air reservoir facilitates the arrangement of the tubes for connecting the air reservoir to the component parts arranged on the engine.

Positioning the air pump and the air valve on opposite sides, respectively, of the air reservoir on the crankcase enable the well-balanced arrangement of the component parts without substantially increasing the width of the body. In addition, providing for the remote control of the pneumatic switch for controlling the air valve by means disposed on the handlebar, permits the auxiliary gear shifting system to be operated by hand instead of by foot and hence it is possible to carry out the gear shifting operation easily at the appropriate time even under conditions in which it is difficult for an operator to use his/her foot.

According to the present invention, a portion of the compressed air is supplied to the actuator for gear shifting operation and the ignition unit reduces the output of the engine temporarily during the operation of the actuator on the basis of a detection signal provided by the pneumatic switch. Therefore, the gear shifting operation can be easily and quickly carried out and the compressed air can be effectively used as sensing means for controlling the output of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear shifting mechanism for a transmission, comprising:

a transmission case for positioning a gear shift mechanism;

a gearshift pedal;

a gearshift spindle supported on the transmission case of the transmission for rotation by said gearshift pedal;

a gearshift arm fixed to the gearshift spindle, said gearshift arm being operatively connected to a gearshift drum journaled on the transmission case for imparting rotation thereto; and a sector gear being formed on the gearshift arm, said sector gear being operatively driven by a driving gear mounted on a rotary shaft of a reversible rotary actuator, said rotary actuator being attached to said transmission case;

whereby imparting movement to said gearshift pedal provides rotation to said gearshift spindle for providing rotation to said gearshift drum for effecting a gear shift and, similarly, actuating said reversible rotary actuator imparts rotation to said driving gear for providing rotation to said gearshift drum and said gearshift pedal for effecting a gear shift.

2. The gear shifting mechanism according to claim 1, wherein said gearshift arm includes a gearshift arm extension projecting outwardly therefrom, said gearshift arm extension including an aperture disposed therein, a stopper pin being operatively positioned within said aperture in said gearshift arm extension for limiting the movement of said gearshift pedal.

3. The gear shifting mechanism according to claim 2, and further including biasing means operatively connected to said gearshift spindle and said pin for normally biasing said gearshift pedal to a neutral position.

4. The gear shifting mechanism according to claim 1, and further including an idler gear mounted for rotation relative to said transmission case and being operatively connected to said driving gear and said sector gear for providing rotation therebetween.

5. The gear shifting mechanism according to claim 1, wherein said gearshift arm includes an aperture disposed therein, a driving ring being operatively connected to said gearshift drum for providing rotation thereto and an eccentric shaft operatively positioned within said aperture in said gearshift arm for limiting the movement of said gearshift drum.

6. The gear shifting mechanism according to claim 5, and further including a reversible ratchet means operatively connected to said driving ring for selectively maintaining a desired gear shift position.

7. The gear shifting mechanism according to claim 1, wherein said reversible rotary actuator is an enlarged chamber having a first chamber and a second chamber divided by a rotary member, supplying an actuating force to said first chamber imparts movement to said rotary member for imparting rotation to said driving gear for imparting rotation to said gearshift drum in a first predetermined direction for effecting a predetermined gear shift operation.

8. The gear shifting mechanism according to claim 7, wherein said reversible rotary actuator is an enlarged chamber having a first chamber and a second chamber divided by a rotary member, supplying an actuating force to said second chamber imparts movement to said rotary member for imparting rotation to said driving gear for imparting rotation to said gearshift drum in a second predetermined direction for effecting a second predetermined gear shift operation.

9. An auxiliary gear shifting system for a motorcycle for actuating a gearshift shaft of a constant-mesh transmission of the motorcycle to shift gears by using external power supplied by pressurized fluid in addition to the actuation of the gearshift shaft through a gearshift arm by a gearshift pedal comprising:

a reversible rotary actuator includes an enlarged chamber having a first chamber and a second chamber divided by a rotary member operatively connected to a gear shift means for shifting gears of said transmission;

a reservoir for containing said pressurized fluid, said reservoir being disposed within a main frame extending longitudinally of a body of the motorcycle; and conduit means in communication with said reservoir and said reversible rotary actuator for selectively supplying pressurized fluid to at least one of said first and second chambers;

whereby supplying pressurized fluid to said first chamber imparts movement to said rotary member for imparting rotation to said gear shift means in a first predetermined direction for effecting a predetermined gear shift operation.

10. The auxiliary gear shifting system according to claim 9, wherein supplying pressurized fluid to said second chamber imparts movement to said rotary member for imparting rotation to said gear shift means in a second predetermined direction for effecting a second predetermined gear shift operation.

11. The auxiliary gear shifting system according to claim 9, and further including an air valve for controlling the supply of pressurized fluid from said reservoir to an actuator disposed adjacent to said gear shift means, said air valve being selectively actuated for effecting a gear shifting, and an air pump for supplying compressed fluid to said reservoir.

12. The auxiliary gear shifting system according to claim 11, wherein said air valve is remote controlled by actuator means disposed on a handlebar of the motorcycle.

13. The auxiliary gear shifting system according to claim 11, wherein a portion of the pressurized fluid is supplied to a pressure switch for detecting the pressure of the pressurized fluid when the actuator operates and to send a signal to an ignition unit for controlling ignition timing of an engine, and said ignition unit reducing the output of an engine temporarily while the actuator operates according to the detection signal of the pressure switch.

14. The auxiliary gear shifting system according to claim 9, and further including a gearshift pedal, a gearshift spindle supported on a transmission case of the transmission for rotation by said gearshift pedal, a gearshift arm fixed to the gearshift spindle, said gearshift arm being operatively connected to a gearshift drum journaled on the transmission case for imparting rotation thereto, and a sector gear being formed on the gearshift arm, said sector gear being operatively driven by a driving gear mounted on a rotary shaft of a reversible rotary actuator, said rotary actuator being attached to said transmission case, whereby imparting movement to said gearshift pedal provides rotation to said gearshift spindle for providing rotation to said gearshift drum for effecting a gear shift and, similarly, actuating said reversible rotary actuator imparts rotation to said driving gear for providing rotation to said gearshift drum and said gearshift pedal for effecting a gear shift.

15. The auxiliary gear shifting system according to claim 14, wherein said gearshift arm includes a gearshift arm extension projecting outwardly therefrom, said gearshift arm extension including an aperture disposed therein, a stopper pin being operatively positioned within said aperture in said gearshift arm extension for limiting the movement of said gearshift pedal.

16. The auxiliary gear shifting system according to claim 15, and further including biasing means operatively connected to said gearshift spindle and said pin for normally biasing said gearshift pedal to a neutral position.

17. The auxiliary gear shifting system according to claim 14, and further including an idler gear mounted for rotation relative to said transmission case and being operatively connected to said driving gear and said sector gear for providing rotation therebetween.

18. The auxiliary gear shifting system according to claim 14, wherein said gearshift arm includes an aperture disposed therein, a driving ring being operatively connected to said gearshift drum for providing rotation thereto and an eccentric shaft operatively positioned within said aperture in said gearshift arm for limiting the movement of said gearshift drum.

19. The auxiliary gear shifting system according to claim 18, and further including a reversible ratchet means operatively connected to said driving ring for selectively maintaining a desired gear shift position.

* * * * *